(12) United States Patent
Sieveking et al.

(10) Patent No.: US 9,109,628 B2
(45) Date of Patent: Aug. 18, 2015

(54) JOURNAL BEARING

(71) Applicant: Solar Turbines Inc., San Diego, CA (US)

(72) Inventors: Edward William Sieveking, San Diego, CA (US); Yuanhong Guan, Peoria, IL (US)

(73) Assignee: Solar Turbines Incorporated, San Diego, CA (US)

( * ) Notice: Subject to any disclaimer, the term of this patent is extended or adjusted under 35 U.S.C. 154(b) by 153 days.

(21) Appl. No.: 14/026,862

(22) Filed: Sep. 13, 2013

(65) Prior Publication Data
US 2015/0078689 A1 Mar. 19, 2015

(51) Int. Cl.
*F16C 33/66* (2006.01)
*F16C 33/10* (2006.01)

(52) U.S. Cl.
CPC ........... *F16C 33/1085* (2013.01); *F16C 33/106* (2013.01)

(58) Field of Classification Search
CPC ........................... F16C 33/106; F16C 33/1085
See application file for complete search history.

(56) References Cited

U.S. PATENT DOCUMENTS

| | | | | |
|---|---|---|---|---|
| 4,345,797 A * | 8/1982 | Ballheimer | ................... | 384/397 |
| 4,719,818 A * | 1/1988 | McCreary | ................... | 475/159 |
| 5,279,497 A * | 1/1994 | Sjodin | ................... | 384/373 |
| 5,567,056 A * | 10/1996 | Blase et al. | ................... | 384/286 |
| 6,056,442 A * | 5/2000 | Ono et al. | ................... | 384/286 |
| 6,676,296 B2 * | 1/2004 | Inoue et al. | ................... | 384/276 |
| 8,657,714 B1 * | 2/2014 | Ghanime et al. | ............ | 475/159 |

OTHER PUBLICATIONS

J.W. Lund, and E. Sibel, Oil Whip whirl orbits of a rotor in sleeve bearings, Journal Engineering for industry, 89, p. 813-823, 1967.
R.F. Lanes, R.D. Flack, D.W. Lewis, Experiments on the Stability and Response of a Flexible Rotor in Three Types of Journal Bearings, ASLE Transactions, vol. 25,3,p. 289-298, 1981.
Dara Childs, Turbomachinery Rotordynamics, Phenomena, Modeling and Analysis, John Wiley & Sons, Inc,1993.
J.S. Rao, Rotor Dynamics, 3rd Edition, New Age International (P) Ltd, Publishers, 1996.
Tominori Yamada, Junichi Mitsui, A study on the unstable vibration phenomena of a reduction gear system, including the lightly loaded journal bearing, Bulletin of the JSME vol. 22, No. 163, 1979.

(Continued)

*Primary Examiner* — Thomas R. Hannon
(74) *Attorney, Agent, or Firm* — Jeffrey A. Ruppel

(57) ABSTRACT

A journal bearing is provided for mounting a gear component thereon and for reducing vibrations from operation of the gear component. The journal bearing includes a cylindrical body having two recessed portions defined thereon. The journal bearing further includes a primary passage extending longitudinally through the cylindrical body, and two secondary passages radially extending from the primary passage to the recessed portions. An angle of the two secondary passages with respect to a horizontal plane of the journal bearing is based on at least one of a magnitude and direction of a predetermined bearing load, a rotational speed of the gear component, a clearance between the journal bearing and the gear component, oil properties, wherein the oil is introduced between the journal bearing and the gear component, and one or more system stability parameters.

20 Claims, 6 Drawing Sheets

(56) References Cited

OTHER PUBLICATIONS

H. R. Simmons and A. J. Smalley, Lateral gear shaft dynamics control torsional stresses in turbine-driven compressor train. American Society of Mechanical Engineers Journal of Engineering for Gas turbine and Power 106, p. 946-951. 1984.

P. Schwibinger, R. Nordmann, The influence of torsional-lateral coupling on the stability behavior of geared rotor systems American Society of Mechanical Engineers Journal of Engineering for Gas Turbine and Power, 110, p. 563-571,1988.

B. Kishor, S.K. Gupta, On the Dynamic Analysis of a Rigid Rotor-Gear Pair-Hydrodynamic Bearing System, Journal of Vibration, Acoustics, Stress and Reliability in Design, Transaction of ASME, vol. 111, Jul. 1989.

Fargére, R., Velex, P., Some simulations of gear—Journal bearing interactions Proceedings of the ASME Design Engineering Technical Conference 8, p. 345-355, 2011.

Y. H. Guan M. Li, T. C. Lim, W. S. Shepard Jr, Comparative analysis of actuator concepts for active gear pair vibration control, Journal of Sound and Vibration vol. 269 p. 273-294, 2004.

W.J. Chen, E.J. Gunter, Introduction to Dynamics of Rotor-Bearing Systems, Trafford Publishing, 2005.

Luis San Andres, XLpressdam ©, laminar flow pressure dam and multiple-lobe journal bearings http://rotorlab.tamu.edu/tribgroup/Soft_fem_bear.htm.

J.W. Lund, The stability of an elastic rotor in journal bearings with flexible, damped supports, Journal of Applied Mechanics, vol. 32, issue4, p. 911-920, 1965.

José A. Vázquez, Lloyd E. Barrett, Ronald D. Flack, A Flexible Rotor on Flexible Bearing Supports. Part I: Stability, 1999 ASME Design Engineering Technical Conferences, Sep. 12-15, 1999, Las Vegas, Nevada.

J.K. Wanga, M.M. Khonsari, Effects of oil inlet pressure and inlet position of axially grooved infinitely long journal bearings. Part I: Analytical solutions and static performance, Tribology International 41, p. 119-131, 2008.

\* cited by examiner

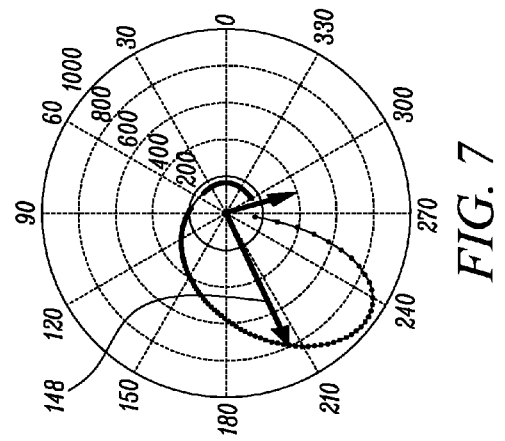
FIG. 7
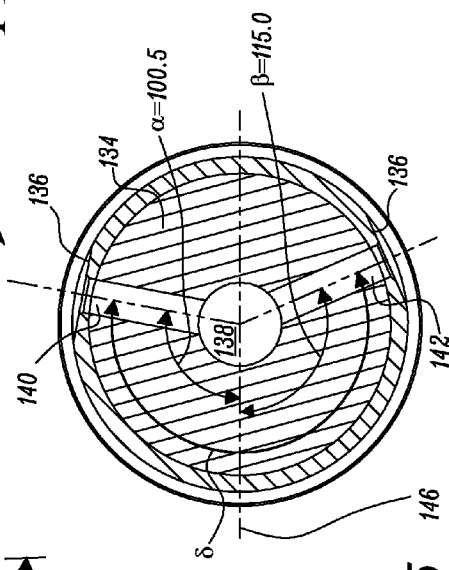
FIG. 6
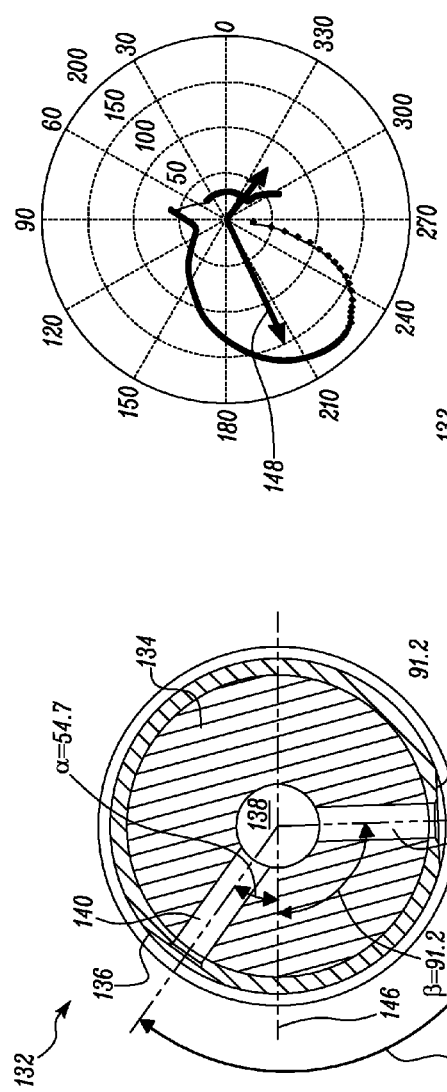
FIG. 4
FIG. 5

JOURNAL BEARING

TECHNICAL FIELD

The present disclosure relates to a journal bearing, and more particularly to a journal bearing configured to reduce vibrations from a gear component mounted thereon.

BACKGROUND

Conventional journal bearings typically include passages and clearances to allow oil for lubrication. However, due to the eccentricity of mounted components in relation to the journal bearing, metal to metal contact may occur. The metal to metal contact may cause uneven rotation, vibration, and wear in the journal bearing. In some cases, the effect of vibration may be observed during an initiation of rotation of the journal bearing. In other cases, vibration may be observed in the journal bearing during partial load and full speed conditions. Further, the vibration may occur depending on a natural frequency of the overall system design using the journal bearings.

The conventional journal bearings may not be designed or configured to allow the oil for damping the vibrations occurring at or near the journal bearing under typical working conditions. Therefore, such journal bearings may be subject to wear during operation and hence, prone to premature failure.

SUMMARY OF THE DISCLOSURE

In one aspect, the present disclosure discloses a journal bearing for mounting a gear component thereon. The journal bearing includes a cylindrical body having two recessed portions defined thereon. The journal bearing further includes a primary passage extending longitudinally through the cylindrical body, and two secondary passages radially extending from the primary passage to the recessed portions. An angle of the two secondary passages with respect to a horizontal plane of the journal bearing is determined based on at least one of a magnitude and direction of a pre-determined bearing load, a rotational speed of the gear component, a clearance between the journal bearing and the gear component, oil properties, wherein the oil is introduced between the journal bearing and the gear component, and one or more system stability parameters.

In another aspect, the present disclosure discloses a journal bearing for mounting a gear component thereon. The journal bearing includes a cylindrical body having two recessed portions defined thereon, and a primary passage extending longitudinally through the cylindrical body. The journal bearing further includes two secondary passages radially extending from the primary passage to the recessed portions, wherein a first secondary passage is located within a range of 54.7±5 degrees measured clockwise with respect to a horizontal plane of the journal bearing, and wherein a second secondary passage is located within a range of 91.2±5 degrees measured counter-clockwise with respect to the horizontal plane.

In another aspect, the present disclosure discloses a journal bearing for mounting a gear component thereon. The journal bearing includes a cylindrical body having two recessed portions defined thereon, and a primary passage extending longitudinally through the cylindrical body. The journal bearing further includes two secondary passages radially extending from the primary passage to the recessed portions, wherein a first secondary passage is located within a range of 100.5±5 degrees measured clockwise with respect to a horizontal plane of the journal bearing, and wherein a second secondary passage is located within a range of 115.0±5 degrees measured counter-clockwise with respect to the horizontal plane.

In another aspect, the present disclosure discloses a method of designing a journal bearing to mount a gear component thereon. The method includes defining a primary passage longitudinally through the cylindrical body. The method further includes defining two secondary passages radially from the primary passage, wherein an angle of the two secondary passages with respect to a horizontal plane of the journal bearing is determined based on at least one of a magnitude and direction of a pre-determined bearing load, a rotational speed of the gear component, a clearance between the journal bearing and the gear component, oil properties, wherein the oil is introduced between the journal bearing and the gear component, and one or more system stability parameters. The method further includes defining two recessed portions on the cylindrical body such that the recessed portions are located adjacent to the secondary passages.

Other features and aspects of this disclosure will be apparent from the following description and the accompanying drawings.

BRIEF DESCRIPTION OF THE DRAWINGS

FIGS. 4-5 are front cross-sectional views of the journal bearing in accordance with different embodiments of the present disclosure;

FIGS. 6-7 illustrate exemplary pressure profiles of the journal bearing;

DETAILED DESCRIPTION

Figure 1:
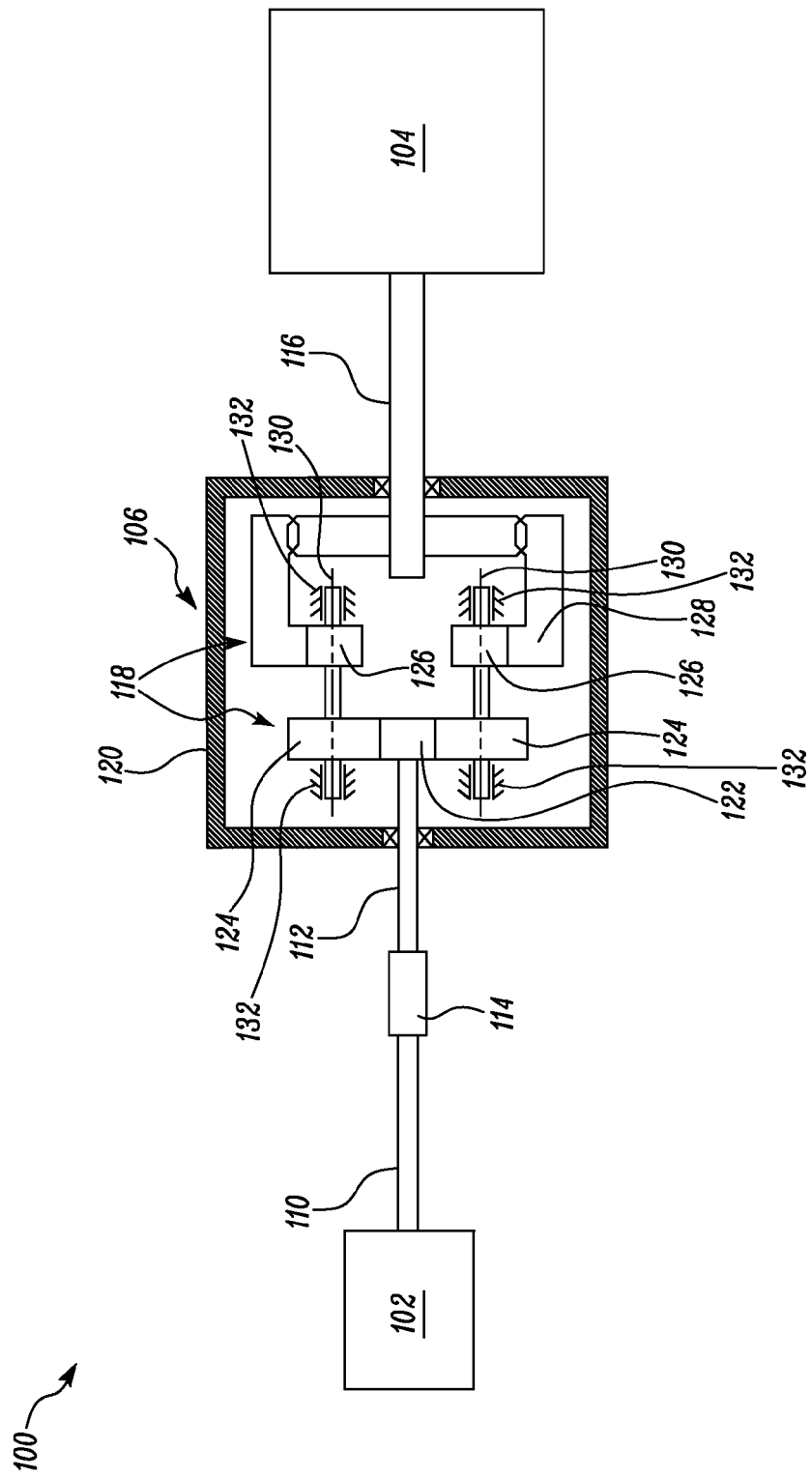
FIG. 1 is a schematic of an exemplary engine assembly including a driver component, a driven component, and a gearbox.

The present disclosure relates to a journal bearing, and more particularly to a journal bearing for mounting a gear component thereon. FIG. 1 shows a schematic of an exemplary engine assembly 100. The engine assembly 100 may include a driver component 102, for example, an engine such as but not limited to, a gas turbine engine, a reciprocating engine, or any other type of machine having a rotating output. The engine assembly 100 may further include a driven component 104, such as for example, a generator, a compressor, or a pump. The driver component 102 may be configured to drive the driven component 104 using a gearbox 106.

The driver component 102 may further include an output shaft 110 coupled with an input shaft 112 of the gearbox 106 via an adapter sleeve 114. The gearbox 106 may include a gearbox output shaft 116 coupled to the driven component 104.

Although, an engine and a generator are used to explain the gearbox 106 of the present disclosure, it is to be noted that the engine and the generator are merely exemplary in nature and hence, non-limiting of this disclosure. Therefore, the gearbox 106 disclosed herein may be employed to direct power from any type of driver component to any type of driven component known in art. Other types of driver components such as electric motors may be substituted for the engine of FIG. 1 while other known types of driven equipment such as compressors, pumps, or drive-shafts may be substituted for the generator.

The gearbox 106 may include one or more gear components 118 disposed within a housing 120. The gears components 118, disclosed herein, may include an input sun gear 122, one or more input star gears 124, one or more output star gears 126, and an output ring gear 128. One input star gear 124 and one output star gear 126 may be configured to rotate about a common axis 130.

Figure 2:
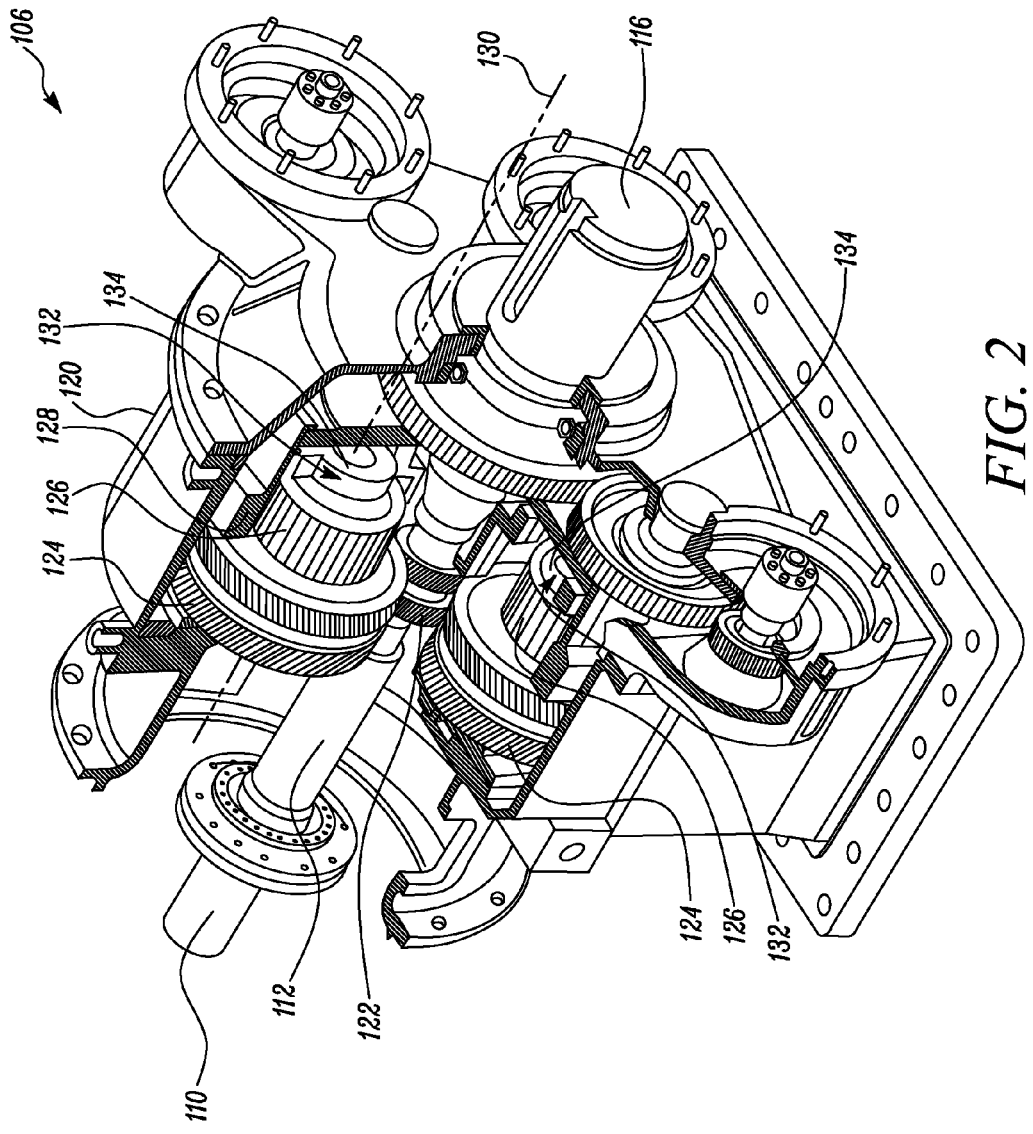
FIG. 2 is a cut away perspective view of the gearbox showing various gear components and two journal bearings.

In an exemplary embodiment as shown in FIG. 2, two input star gears 124 and two output star gears 126 are shown. However, in other embodiments, any number of star gears may be used to represent the input star gears 124 and the output star gears 126 of the gearbox 106.

The input sun gear 122 may be rigidly coupled with the input shaft 112 and configured to rotate upon rotation of the input shaft 112 (referring to FIGS. 1-2). The input star gears 124 and the output star gears 126 may be disposed between the input sun gear 122 and the output ring gear 128. The input star gears 124 may be disposed in mesh with the input sun gear 122. The output star gears 126 may be disposed in mesh with the output ring gear 128. The input star gears 124 and the output star gears 126 may be floating gears. Therefore, one input star gear 124 and one output star gear 126 may be configured to rotate about the common axis 130.

The output ring gear 128 may be coupled to the gearbox output shaft 116 of the gearbox 106 Therefore, during operation, the driven component 104 may be configured to rotate upon rotation of the output ring gear 128 and the gearbox output shaft 116 (referring to FIG. 1).

Figure 3:
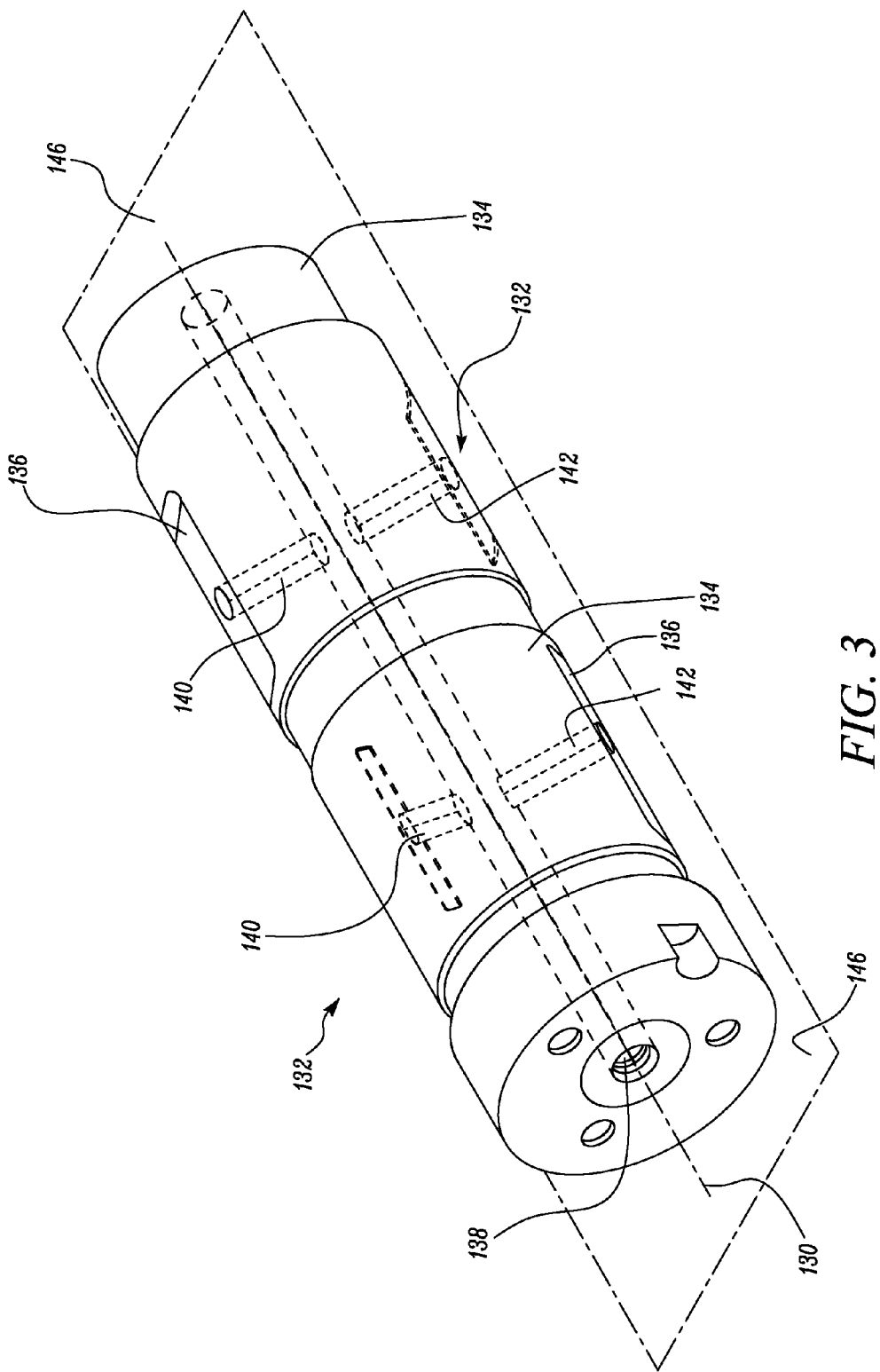
FIG. 3 is perspective view of the journal bearings in accordance with an embodiment of the present disclosure.

The gearbox 106 may further employ one or more journal bearings 132 configured to hydrodynamically support the gear components 118. Referring to FIGS. 2-3, two journal bearings 132 may be used to mount one of the input star gears 124 and one of the output star gears 126 that are configured to rotate about the common axis 130. However, the number of journal bearings 132 used may change depending on a number of gear components within the gearbox 106. Explanation to the journal bearings 132 will be made with reference to FIGS. 2-7.

Referring to FIG. 3-4, each of the journal bearings 132 includes a cylindrical body 134 having two recessed portions 136 defined thereon (one recessed portion 136 shown in dashed lines and another recessed portion 136 shown in solid lines on each journal bearing 132 of FIG. 3). The journal bearing 132 further includes a primary passage 138 extending longitudinally through the cylindrical body 134, and two secondary passages 140, 142 radially extending from the primary passage 138 to the recessed portions 136.

The primary passage 138 and the secondary passages 140, 142 may be configured to fluidly communicate oil onto the recessed portions 136 of the journal bearing 132 (as shown in FIG. 3). In one embodiment, the oil communicated onto the recessed portions 136 may be configured to reduce vibrations from the gear component 118 mounted on the journal bearing 132 as will be explained herein.

For ease in clarity and understanding of the present disclosure, the two secondary passages 140, 142 may be considered to include a first secondary passage 140 and a second secondary passage 142. Therefore, reference may be made herein individually to any of the secondary passages 140, 142 as the first secondary passage 140, and the second secondary passage 142.

In one embodiment, the first secondary passage 140 may be located within a range of 54.7±5 degrees measured clockwise with respect to a horizontal plane 146 of the journal bearing 132 and the second secondary passage 142 may be located within a range of 91.2±5 degrees measured counter-clockwise with respect to the horizontal plane 146. In one exemplary embodiment as shown in FIG. 4, the first secondary passage 140 may be located at an angle $\alpha$ of 54.7 degrees measured clockwise with respect to the horizontal plane 146 while the second secondary passage 142 may be located at an angle $\beta$ of 91.2 degrees measured counter-clockwise with respect to the horizontal plane 146.

In another embodiment, the first secondary passage 140 may be located within a range of 100.5±5 degrees measured clockwise with respect to the horizontal plane 146 and the second secondary passage 142 may be located within a range of 115.0±5 degrees measured counter-clockwise with respect to the horizontal plane 146. In one exemplary embodiment as shown in FIG. 5, the first secondary passage 140 may be located at an angle $\alpha$ of 100.5 degrees measured clockwise with respect to the horizontal plane 146 while the second secondary passage 142 may be located at an angle $\beta$ of 115.0 degrees measured counter-clockwise with respect to the horizontal plane 146.

It may be noted that the horizontal plane 146 disclosed herein is horizontally oriented when considering the journal bearings 132 disposed above the input sun gear 122 and underlying beneath the output ring gear 128 (Referring to FIGS. 1 and 2). The orientation of this horizontal plane 146 may change (for example, to a slanted plane) when considering the journal bearings 132 disposed below and at either side of the input sun gear 122 and the output ring gear 128. Therefore, the horizontal plane 146 of the journal bearings 132 should be determined based on a meshing position of the input and output star gears 124, and 126 with the input sun gear 122 and the output ring gear 128 respectively.

Further, in various embodiments of the present disclosure as shown in FIG. 4 and FIG. 5, the first secondary passage 140 may be located at an angle $\delta$ of approximately 100 to 260 degrees from the second secondary passage 142.

FIGS. 6-7 illustrate exemplary pressure profiles of the journal bearings 132 associated with the input star gear 124 (as shown in FIG. 1). More specifically, FIG. 6 illustrates the pressure profile of the journal bearing 132 during partial load and full speed conditions, for example, at 20% load of the driven component 104 and a full speed condition as determined by the driver component 102 (referring to FIG. 1). Further, FIG. 7 illustrates the pressure profile of the journal bearing 132 at 100% load of the driven component 104 and full speed condition as determined by the driver component 102 (referring to FIG. 1).

Referring to FIGS. 4-7, in an embodiment, the angles $\alpha$, $\beta$ of the first secondary passage 140 and the second secondary passage 142 with respect to the horizontal plane 146 of the journal bearing 132 may be determined based on a magnitude and direction of a pre-determined bearing load (as indicated by a first vector 148 in FIGS. 6-7). Although it is disclosed herein that the angles $\alpha$, $\beta$ are determined based on the magnitude and direction of the pre-determined bearing load of FIGS. 6-7, it is to be noted that the first vector 148 obtained at 20% and 100% load, and full speed conditions shown in FIGS. 6-7 is merely exemplary in nature and hence, non-limiting of this disclosure.

Therefore, in other embodiments, pressure profiles corresponding to other load and speed conditions may be plotted and the angles $\alpha$, and $\beta$ may be determined based on the resulting vector. For example, in one embodiment, the angles $\alpha$, and $\beta$ may be determined based on a magnitude and direction of the pre-determined bearing load observed at 50% load of the driven component 104 and a full speed condition of the driver component 102. In another embodiment, the angles $\alpha$, and β may be determined based on the magnitude and direction of the pre-determined bearing load observed during a start of rotation of the journal bearing 132, for example, at 20% load of the driven component 104 and cranking speed as determined by the driver component 102 (referring to FIG. 1).

In another embodiment, the angles α, β of the first secondary passage 140 and the second secondary passage 142 with respect to the horizontal plane 146 may be determined based on a clearance between the journal bearing 132 and the gear component 118. In yet another embodiment, the angles α, β may be determined based on a rotational speed of the gear component 118 mounted on the journal bearing 132.

In another embodiment, the angles α, β of the first secondary passage 140 and the second secondary passage 142 with respect to the horizontal plane 146 may be determined based on one or more system stability parameters. In one embodiment, the system stability parameter may include a natural system frequency and a damping co-efficient of the gearbox 106. It may be noted that the natural system frequency and the damping co-efficient disclosed herein may include the natural frequencies and the damping co-efficients of the various components disposed within the gearbox 106.

In another embodiment, the angles α, β of the first secondary passage 140 and the second secondary passage 142 with respect to the horizontal plane 146 may be determined based on oil properties such as but not limited to oil temperature, oil inlet pressure, oil outlet pressure, or oil viscosity. The secondary passages 140, 142, and the recessed portions 136 are located such that the oil exiting the secondary passages 140, 142 may be configured to hydrodynamically support the gear component 118 mounted thereon.

Figure 8:
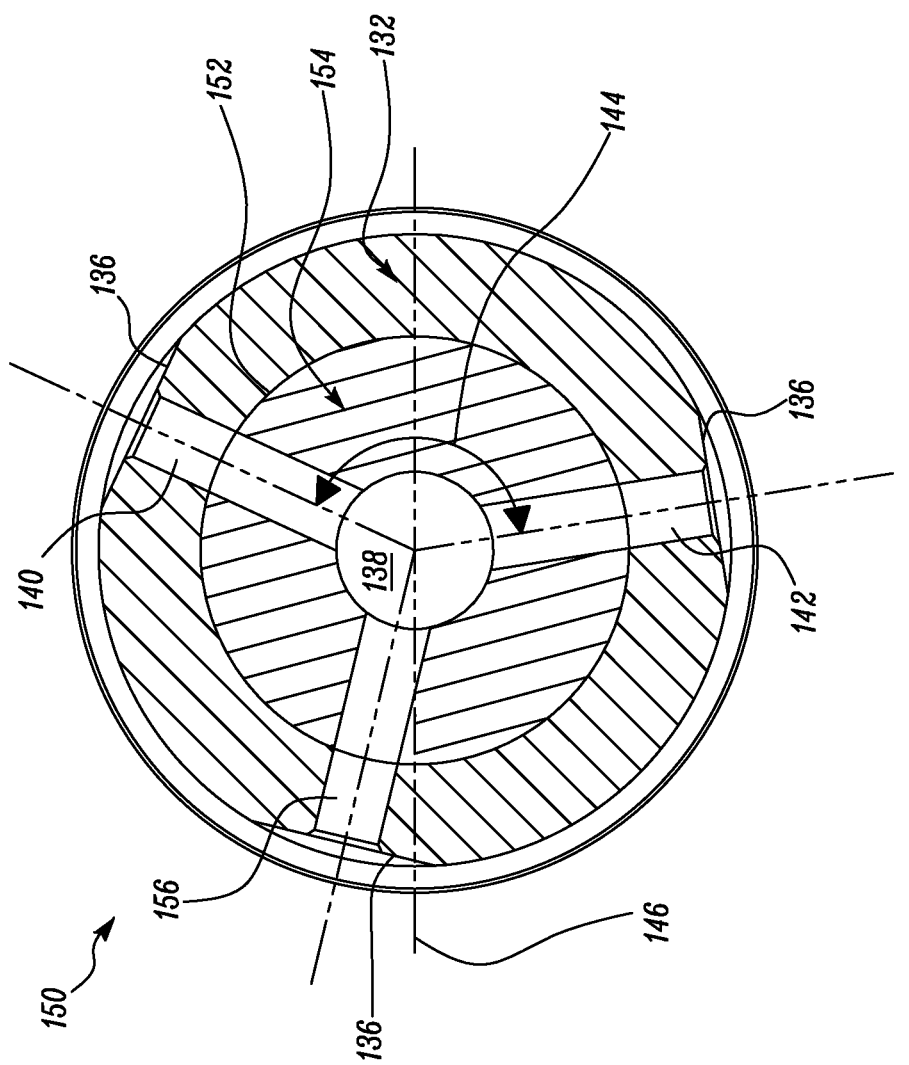
FIG. 8 illustrates an exemplary bearing assembly employing the journal bearing.

Referring to FIG. 8, in an embodiment of the present disclosure, a bearing assembly 150 may be formed by spray-welding an anti-friction material, for example, a Babbitt material circumferentially over an outer surface 152 of a cylindrical shaft 154. The Babbitt material may define the journal bearing 132 on the cylindrical shaft 154.

In the preceding embodiment, the cylindrical shaft 154 may be define the primary passage 138 while the journal bearing 132, formed by the Babbitt material, may be drilled radially such that the secondary passages 140, 142 extend into the cylindrical shaft 154 and connect with the primary passage 138. Furthermore, the recessed portions 136 may be formed on the Babbitt material by commonly known processes such as milling or spot-facing. In this manner, the cylindrical shaft 154 together with the journal bearing 132 may form the bearing assembly 150 configured to rotatably support the gear component 118 thereon.

Although the present disclosure discloses the journal bearing 132 with two secondary passages 140, 142, it is to be noted that the number of secondary passages disclosed herein is non-limiting of this disclosure. Any number of secondary passages may be defined within the cylindrical body 134 depending on one or more requirements of an application. Therefore, the journal bearing 132 may be configured to include any number of secondary passages such as, for example, three secondary passages—the first secondary passage 140, the second secondary passage 142, and a third secondary passage 156 as shown in FIG. 8. A person having ordinary skill in the art may acknowledge that various embodiments pertaining to the journal bearing 132 having two secondary passages 140, 142 may be similarly applicable to journal bearings having more than two secondary passages.

Industrial Applicability

Conventional journal bearings typically include passages and clearances for lubrication. However, due to the eccentricity of mounted components in relation to the journal bearing, metal to metal contact may occur. The metal to metal contact may cause uneven rotation and vibration in the journal bearing. In some cases, the effect of vibration may be observed during initiation of rotation of the journal bearing. In other cases, vibration may be observed in the journal bearing during partial load and full speed conditions. Further, the vibration may occur depending on a natural frequency of the overall system design using the journal bearings.

Figure 9:
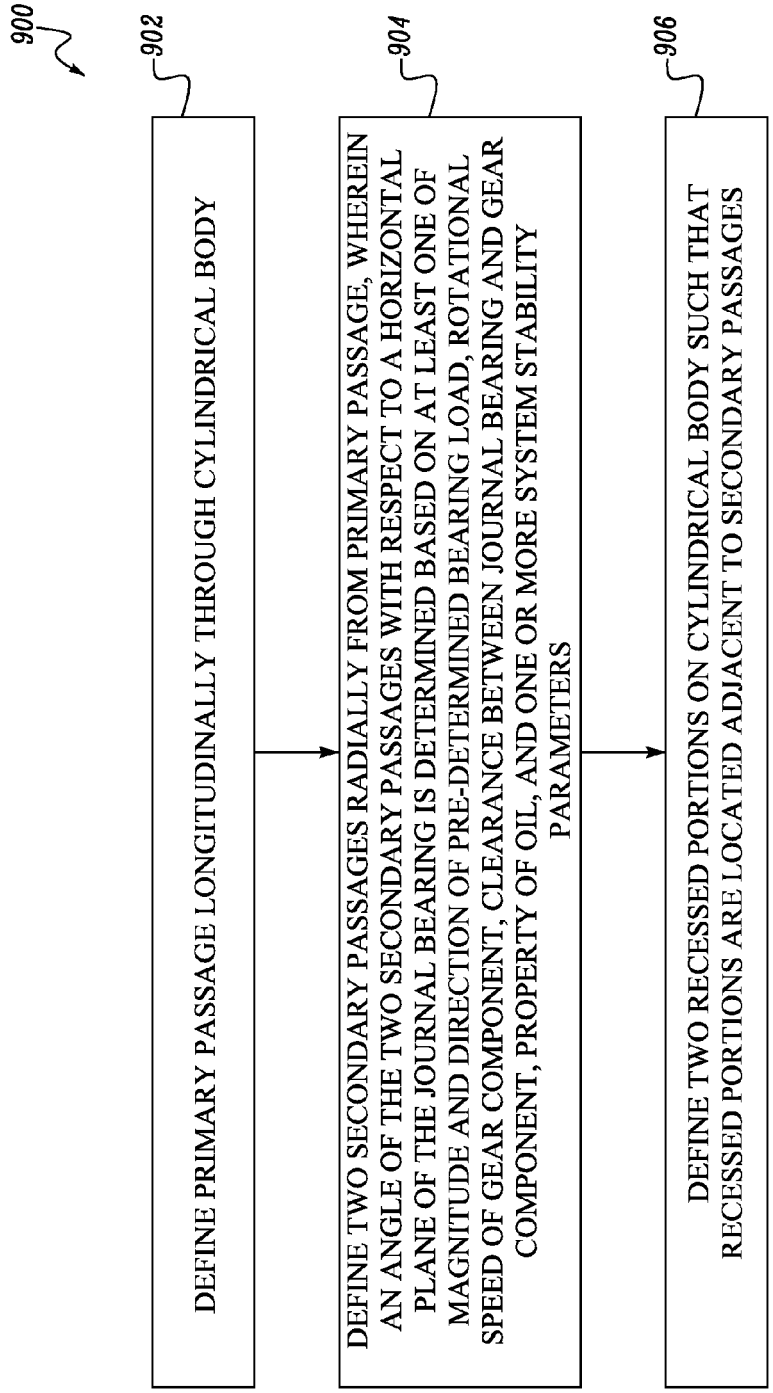
FIG. 9 is a method of designing the journal bearing.

FIG. 9 is a method 900 of designing the journal bearing 132 to mount the gear component 118 thereon. At step 902, the method 900 includes defining the primary passage 138 longitudinally through the cylindrical body 134. At step 904, the method 900 further includes defining the two secondary passages 140, 142 radially from the primary passage 138, wherein the angles α, β of the two secondary passages 140, 142 with respect to the horizontal plane 146 of the journal bearing 132 is determined based on at least one of the magnitude and direction of the pre-determined bearing load, the rotational speed of the gear component 118, the clearance between the journal bearing 132 and the gear component 118, oil properties, and the system stability parameters. At step 906, the method 900 further includes defining the two recessed portions 136 on the cylindrical body 134 such that the recessed portions 136 are located adjacent to the secondary passages 140, 142.

In an embodiment, the magnitude and direction of the pre-determined bearing load is the magnitude and direction during start of rotation of the journal bearing 132. In another embodiment, the magnitude and direction of the pre-determined bearing load is the magnitude and direction during the rotation of the journal bearing 132 at a pre-determined speed and load condition, for example, 20% load and full speed condition as determined by the driven component 104 and the driver component 102 of FIG. 1.

In one embodiment, the system stability parameters may include the natural system frequency and the damping co-efficient of the gearbox 106 and the various components disposed within the gearbox 106. Typically, a negative damping coefficient may cause oil-whirl when components such as shafts, bearings, or gears rotate in oil. Furthermore, when a frequency of the oil whirl is substantially close to the natural system frequency i.e. the natural frequency of the gearbox and the components disposed within, oil whip may occur. This oil whip may manifest itself as resonance and cause vibrations in the gearbox. A person having ordinary skill in the art may acknowledge that the vibrations in the gearbox may lead to noise, wear, and premature failure of the gearbox.

The first and second secondary passages 140, 142 disclosed herein, are located such that the oil exiting the secondary passages 140, 142 may reduce the magnitude of, or prevent the oil-whip condition from occurring in the gearbox 106. Thus, the gearbox 106 may operate smoothly with minimal noise and vibration upon reduction of oil-whip therein. Further, metal to metal contact may be avoided thereby causing minimal or no wear of the journal bearing 132.

In an embodiment, the method 900 includes locating the first and the second secondary passages 140, 142 such that the angle δ between the first and the second secondary passages 140, 142 is in the range of approximately 100 to 260 degrees. In another embodiment, the method 900 includes locating the first secondary passage 140 at an angle α of approximately 54.7 degrees with respect to the horizontal plane 146, and the second secondary passage 142 at an angle β of approximately 91.2 degrees with respect to the horizontal plane 146. The angles α, β, and δ may change depending on various other factors including but limited to a type of the gearbox used, the overall system design of the gearbox 106, and a stability analysis performed on the gearbox 106.

The orientation of the first and second secondary passages 140, 142 at the angles α, and β with respect to the horizontal plane 146, and with the determined angle δ between the first and second secondary passages 140 may cause oil to exit in directions such that forces of the oil counteract the forces of the bearing load. Thus, during operation, the oil may be configured to hydrodynamically support the gear component 118 and reduce transfer of vibrations from the gear component 118 to the journal bearing 132. Therefore, a service life of the journal bearing 132 may be prolonged thus saving costs, time, and effort previously involved in repairs and replacement of conventional journal bearings.

Further, the journal bearing 132 disclosed herein, may be manufactured easily using Babbitt material or maybe configured with a Tri-metal arrangement commonly known in the art. Simple and known manufacturing processes such as but not limited to spray welding may be used to manufacture the journal bearing 132 of the present disclosure.

Although a specific configuration and type of gearbox 106 has been used to explain various embodiments herein, it may be noted that the scope of this disclosure is not limited to any specific configuration or type of the gearbox. Hence, any gearbox including one or more gear components disposed in mesh with each other may employ the journal bearing 132 disclosed herein to hydrodynamically support the gear components.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A journal bearing for mounting a gear component thereon, the journal bearing comprising:
   a cylindrical body comprising:
      two recessed portions defined on the cylindrical body;
      a primary passage extending longitudinally through the cylindrical body; and
      two secondary passages radially extending from the primary passage to the recessed portions, wherein an angle of the two secondary passages with respect to a horizontal plane of the journal bearing is based on at least one of the following:
         magnitude and direction of a pre-determined bearing load;
         rotational speed of the gear component;
         clearance between the journal bearing and the gear component;
         oil properties, wherein the oil is introduced between the journal bearing and the gear component; and
         one or more system stability parameters.

2. The journal bearing of claim 1, wherein the primary passage and the secondary passages are configured to fluidly communicate oil onto the recessed portions such that the oil is configured to reduce vibrations from the gear component mounted on the journal bearing.

3. The journal bearing of claim 1, wherein the system stability parameters comprises a natural system frequency and a damping coefficient of a gearbox employing the journal bearing.

4. The journal bearing of claim 1, wherein a first secondary passage is located within a range of 54.7±5 degrees measured clockwise with respect to the horizontal plane of the journal bearing, and wherein a second secondary passage is located within a range of 91.2±5 degrees measured counter-clockwise with respect to the horizontal plane.

5. The journal bearing of claim 1, wherein a first secondary passage is located within a range of 100.5±5 degrees measured clockwise with respect to the horizontal plane of the journal bearing, and wherein a second secondary passage is located within a range of 115.0±5 degrees measured counter-clockwise with respect to the horizontal plane.

6. A bearing assembly comprising:
   a shaft disposed within the primary passage; and
   employing the journal bearing of claim 1.

7. A gearbox employing the journal bearing of claim 1.

8. A journal bearing for mounting a gear component thereon, the journal bearing comprising:
   a cylindrical body comprising:
      two recessed portions defined on the cylindrical body;
      a primary passage extending longitudinally through the cylindrical body; and
      two secondary passages radially extending from the primary passage to the recessed portions, wherein a first secondary passage is located within a range of 54.7±5 degrees measured clockwise with respect to a horizontal plane of the journal bearing, and wherein a second secondary passage is located within a range of 91.2±5 degrees measured counter-clockwise with respect to the horizontal plane.

9. The journal bearing of claim 8, wherein an angle between the two secondary passages is in a range of approximately 100 to 260 degrees.

10. The journal bearing of claim 8, wherein the angle between the two secondary passages is based on at least one of the following:
   magnitude and direction of a pre-determined bearing load;
   rotational speed of the gear component;
   clearance between the journal bearing and the gear component;
   oil properties, wherein the oil is introduced between the journal bearing and the gear component; and
   one or more system stability parameters.

11. The journal bearing of claim 10, wherein the system stability parameters comprises a natural system frequency and a damping coefficient of a gearbox employing the journal bearing.

12. A journal bearing for mounting a gear component thereon, the journal bearing comprising:
   a cylindrical body comprising:
      two recessed portions defined on the cylindrical body;
      a primary passage extending longitudinally through the cylindrical body; and
      two secondary passages radially extending from the primary passage to the recessed portions, wherein a first secondary passage is located within a range of 100.5±5 degrees measured clockwise with respect to a horizontal plane of the journal bearing, and wherein a second secondary passage is located within a range of 115.0±5 degrees measured counter-clockwise with respect to the horizontal plane.

13. The journal bearing of claim 12, wherein an outside angle between the two secondary passages is in a range of approximately 100 to 260 degrees.

14. The journal bearing of claim 12, wherein the angle between the two secondary passages is based on at least one of the following:

magnitude and direction of a pre-determined bearing load;
rotational speed of the gear component;
clearance between the journal bearing and the gear component;
oil properties, wherein the oil is introduced between the journal bearing and the gear component; and
one or more system stability parameters.

15. The journal bearing of claim 14, wherein the system stability parameters comprises a natural system frequency and a damping coefficient of a gearbox employing the journal bearing.

16. A method of designing a journal bearing to mount a gear component thereon, the method comprising:
defining a primary passage longitudinally through a cylindrical body;
defining two secondary passages radially from the primary passage, wherein an angle of the two secondary passages with respect to a horizontal plane of the journal bearing is determined based on at least one of the following:
magnitude and direction of a pre-determined bearing load;
rotational speed of the gear component;
clearance between the journal bearing and the gear component;
oil properties, wherein the oil is introduced between the journal bearing and the gear component; and
one or more system stability parameters; and
defining two recessed portions on the cylindrical body such that the recessed portions are located adjacent to the secondary passages.

17. The method of claim 16, wherein the angle between the two secondary passages is in a range of approximately 100 to 260 degrees.

18. The method of claim 16, wherein a first secondary passage is located within a range of 54.7±5 degrees measured clockwise with respect to the horizontal plane of the journal bearing, and wherein a second secondary passage is located within a range of 91.2±5 degrees measured counter-clockwise with respect to the horizontal plane.

19. The method of claim 16, wherein a first secondary passage is located within a range of 100.5±5 degrees measured clockwise with respect to the horizontal plane of the journal bearing, and wherein a second secondary passage is located within a range of 115.0±5 degrees measured counter-clockwise with respect to the horizontal plane.

20. The method of claim 16, wherein the magnitude and direction of the pre-determined bearing load is a magnitude and direction during one of a start of rotation of the journal bearing, and a rotation of the journal bearing at a pre-determined speed and load condition, and wherein the system stability parameters comprises a natural system frequency and a damping coefficient of a gearbox employing the journal bearing.

* * * * *